July 28, 1964   H. J. HAWTHORNE ETAL   3,142,345
METHOD AND APPARATUS FOR ROTARY DRILLING
WITH COMPRESSIONAL WAVES
Filed Sept. 15, 1959   6 Sheets-Sheet 1

INVENTORS
HERBERT J. HAWTHORNE
PAUL P. CAREY

BY Cushman, Darby & Cushman
ATTORNEYS

July 28, 1964  H. J. HAWTHORNE ETAL  3,142,345
METHOD AND APPARATUS FOR ROTARY DRILLING
WITH COMPRESSIONAL WAVES
Filed Sept. 15, 1959  6 Sheets-Sheet 3

INVENTORS
HERBERT J. HAWTHORNE
PAUL P. CAREY

BY Cushman, Darby & Cushman
ATTORNEYS

INVENTORS
HERBERT J. HAWTHORNE
PAUL P. CAREY

BY Cushman, Darby & Cushman
ATTORNEYS

July 28, 1964

H. J. HAWTHORNE ETAL 3,142,345

METHOD AND APPARATUS FOR ROTARY DRILLING WITH COMPRESSIONAL WAVES

Filed Sept. 15, 1959

INVENTORS
HERBERT J. HAWTHORNE
PAUL P. CAREY

BY Cushman, Darby & Cushman

ATTORNEYS

July 28, 1964

H. J. HAWTHORNE ETAL 3,142,345

METHOD AND APPARATUS FOR ROTARY DRILLING
WITH COMPRESSIONAL WAVES

Filed Sept. 15, 1959

INVENTORS
HERBERT J. HAWTHORNE
PAUL P. CAREY

BY Cushman, Darby & Cushman

ATTORNEYS

United States Patent Office 3,142,345
Patented July 28, 1964

3,142,345
METHOD AND APPARATUS FOR ROTARY DRILL-
ING WITH COMPRESSIONAL WAVES
Herbert J. Hawthorne, P.O. Box 7366, and Paul P. Carey,
Box 63, both of Houston, Tex.
Filed Sept. 15, 1959, Ser. No. 840,068
2 Claims. (Cl. 175—57)

This invention relates to drilling and more particularly to method and apparatus for drilling holes in earth formations for purposes of blasting, exploration, obtaining water or petroleum products and the like.

In general, there have been two distinct types of drilling procedures employed in earth boring for the purposes specified above, namely rotary drilling and percussion drilling. The most common procedure is the rotary type drilling which employs two mechanical motions, namely rotation and thrust or weight applied to a drilling bit or tool. This procedure is now generally practiced with only two types of bits for cutting or chipping and removing the formation being drilled. The first type of bit is generally known as a "drag bit," and this type is usually employed in drilling soft formations. The first drag bits were called "fishtail" bits because of their flat shape and the fact that their two cutter blades formed the shape of a fishtail. Subsequently, improved drag bits were developed, examples of which are shown and described in U.S. Patents No. 2,615,684; No. 2,666,622; No. 2,695,158; and No. 2,783,973.

In recent years the efficiency of drag bits has been very much improved through the application of tungsten carbide to the cutting edges. Moreover, the shape of the cutting edges has been improved so that they will effect a more efficient chipping action in some formations.

Where harder formations are encountered, it has been general to use roller or cone-type bits. These bits are generally made up of a number of spool-type rollers mounted on a shaft or axle across the bottom end of the drilling bit, the rollers having notches cut on the outer surface which form cutting teeth. The rollers or cones are designed so as to cover and contact the complete surface of the bottom of the hole being drilled. This is accomplished by spacing the distance between the teeth differently on each roller or cone so that when a single rotation is completed, the surface at the bottom of the hole is almost completely contacted by one or more of the teeth. If the drill is rotated and thrust or weight is applied to these bits, a chipping action takes place. Due to the rapid rolling action of these rollers or cones, the protruding teeth come into contact with the formation and under thrust they penetrate the formation to some extent in a vertical manner causing the rock or harder formation to chip off horizontally in all directions. As the rotation is continued with the thrust applied, the rock or formation is removed and the hole is drilled deeper.

The original method of percussion drilling was practiced by the use of a hand type chisel shaped cutting bit somewhat longer than the depth of the hole to be drilled and also by a hammer for striking the top end of the bit to drive it into the formation, causing a chipping action. The bit was slightly rotated after each stroke to change the point of contact and to also cover the entire periphery of the hole being drilled. This method was carried forward in development to the present tools used in mining and other rock blast hole drilling, commonly called percussion air hammers with some electric and mechanical as well as fluid hammers being used.

Percussion drilling was also developed for deep well or bore hole drilling by the use of rope and wire lines as a medium for lifting and dropping a bit of the chisel type while striking the bottom of a hole several hundred or thousands of feet deep. The method still remains the same as the striking effect is accomplished by having a slip joint placed between the joint of the bit and the ram or drill stem just above the bit so as the bit is lifted off the bottom by the rope or wire line, the slip joint is also expanded and as the bit is dropped to the bottom again the ram or stem above strikes a blow on top of the bit, causing the bit point to be driven into the earth or rock formations. The twisted nature of these ropes or wire lines used also causes a rotating effect on the bit while it is in suspension and it usually strikes the bottom of the hole in a different place on each stroke. This rotating motion insures a round hole and more or less an even cutting action for the full periphery of the hole being drilled.

In accordance with the present invention, it has been discovered that greatly improved drilling can be achieved if a rotary drag-type or roller bit be used with application of percussion blows. The bit and related equipment is to be one fully designed for and capable of drilling by rotary motion alone. Added to the aforesaid equipment is provision for generating in the bit or stem above the bit, compressional waves which travel to the cutting edges of the bit. The percussion blows are delivered or transmitted to the bit cutting edges while these edges are continuously forced down against the formation. There is no bouncing of the bit up off the bottom. By this new combination of features and operational steps great increases in drilling speed have been achieved, and with related reduction of wear on the bit.

It has been discovered that the compressional waves can be generated in the drill string above the bit. Best results appear to occur if the waves are transmitted through drill string which is under compression, due to its own weight and/or additional downward force exerted as by jacking the drilling rig up upon the string. Thus, the compressional wave generator may be above the ground level at the rig, or may be in the hole but above the bit.

It is known in drilling deep holes to exert upward forces on the drill string at the rig after a predetermined known length of string is in the hole, because the weight of all of it would be too much for the bit to bear. In this circumstance, the compressional waves of the present invention preferably are to be generated in the drill string substantially at the place along the string where the internal stresses change from being compressional ones to tensile ones.

There have been some attempts and proposals which purport to combine rotary and percussion drilling. However, in these proposals the greater amount of energy is applied to the percussion stroke and very little is applied as a constant thrust. The emphasis is always placed on the percussion as the means of drilling and the energy or power is diverted to this method over the use of constant thrust and rotation as used in the method of straight rotary drilling. This creates a serious disadvantage in all-purpose drilling, since the bit design must be changed to take the heavy blows required to progress with the percussion method. Therefore, the rotary drill bit becomes useless as such due to the fact that rotary drilling is accomplished economically only with drilling bits designed for rotary-type drilling.

In the present invention, rotary and percussion procedures are combined in such a way that the advantages of both are obtained without the disadvantages inherent in the previous proposals for combining the two. In general, in the present invention, the emphasis is placed on thrust for penetration and rotation for action in cutting with the application of percussion blows of lesser pounds per blow than the constant thrust being applied in rotary drilling.

The application of a very light percussion blow applied to the bit while under thrust causes a chipping action on the formation or rock at that moment. The blow is applied to any point in the drill string above the bit, preferably at a point in the string which is under thrust or compression. These strokes which are light in comparison to the heavy thrust being applied to the bit, cause the point of the bit to move slightly in a downward manner, thus causing a chipping action on the formation at that point. The heavier thrust forces maintain the bit in contact with the formation at all times so that the bit does not move off of the formation after a percussion blow as in conventional percussion drilling practices. As the bit is rotated and the blows are applied, the chipping and cutting action combined causes very fast penetration and harder formations are drilled with much greater speeds than with the commonly used rotary drag-type or roller bits. Bit wear is reduced as less friction is generated while using the chipping action as applied under thrust.

Accordingly, it is an abject of the present invention to provide a method of drilling holes in earth formations in accordance with the principles enunciated above.

Another object of the present invention is the provision of a method of drilling of the type described which obtains faster penetration than methods heretofore utilized.

A further object of the present invention is the provision of apparatus for drilling holes in earth formations which is operable to obtain a very fast penetration witth less bit wear.

These and other objects of the present invention will become more apparent during the course of the following detailed description and appended claims.

The invention may best be understood with reference to the accompanying drawings, wherein illustrative embodiments are shown.

Figure 1:
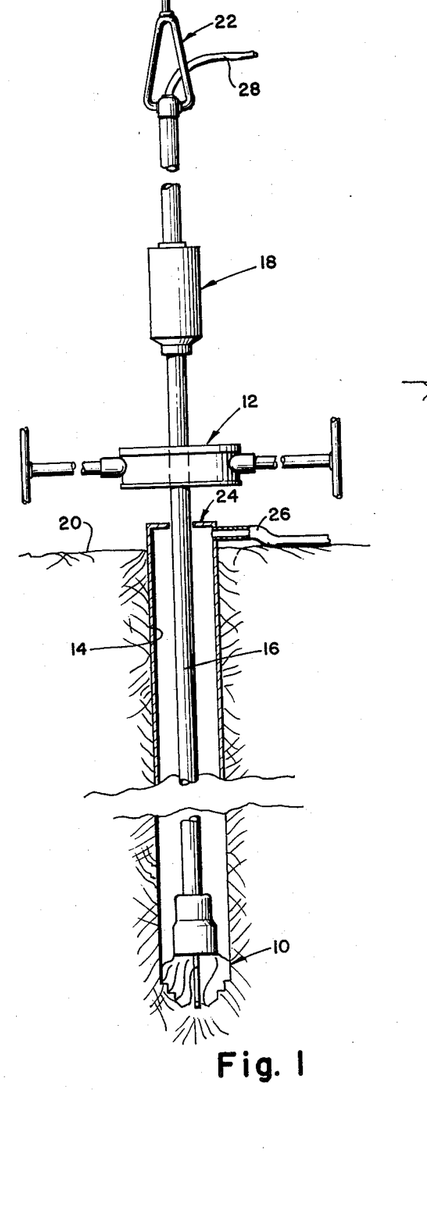
FIGURE 1 is a fragmentary cross-sectional view of an oil well installation embodying the principles of the present invention with certain parts broken away for purposes of clearer illustration.
Figure 2:
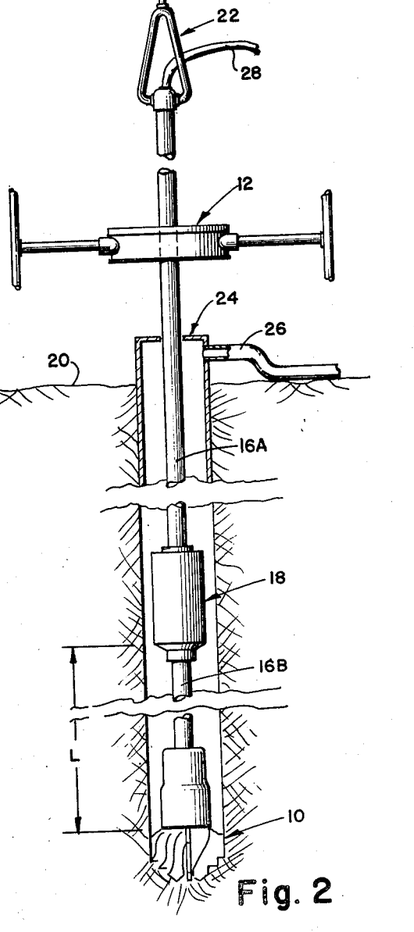
FIGURE 2 is a view similar to FIGURE 1 showing a modified installation embodying the principles of the present invention.

Referring first to FIGURES 1 and 2, the practice of the present invention requires a rotary type drilling bit, designated generally by reference character 10, connected to a device usually termed a "kelly," designated generally by reference character 12, for imparting rotary motion to the drag bit for drilling hole 14 in the formation. Intervening between the bit 10 and the kelly 12 is a length of conventional structure, usually in hollow tubular form, sometimes referred to in the trade as drill string or drill rod. In FIGURE 1 this structure is designated by reference character 16. In FIGURE 2 the equivalent member appears in two sections designated 16A and 16B.

A final major component for the practice of the invention is a percussion hammer mechanism, designated generally by reference character 18. Particular suitable mechanisms will be described in detail hereinbelow. At this point in the explanation, it suffices to say that there is to be a continuous rigid structure comprising the aforesaid drill string or rod between the hammer mechanism 18 and the bit 10 so that compressional waves developed in the string or rod by action of the hammer mechanism will be transmitted to the drilling bit.

One manner of practice of the invention is shown in FIGURE 1, wherein the percussion hammer mechanism 18 is used above the surface 20 of the formation. The kelly 12 may be above or below the hammer mechanism 18, being shown below the hammer mechanism in FIGURE 1.

A different manner of practice of the invention is shown in FIGURE 2, in that the hammer mechanism 18 is used down in the hole intermediate the bit 10 and the formation surface 20. The dimension L shown in FIGURE 2 is used for the purpose of explaining that the distance from the bit to the percussion hammer mechanism 18 may be different from one installation to another. It satisfies the invention if the hammer mechanism is located immediately on the bit 10, or a considerable distance up the drill string. The latter case, of course, merges with the case shown in FIGURE 1 where the hammer mechanism is above the surface of the formation. In any of these cases, the compressional waves generated by the percussion hammer mechanism are transmitted through the medium of the drill string to the cutting edges of the rotary bit 10.

The practice of the invention, referring to both FIGURES 1 and 2, is to activate the kelly device in any of the usual ways, so that continuing rotation is imparted to the rotary drag bit 10. The bit 10 will be caused to exert a downward force on the bottom of the hole being drilled in the formation due to the natural weight of the bit 10 and the drill string attached to and bearing down on the bit. As is well known practice, particularly where the hole is shallow, if the natural weight of the bit, the drill string and associated parts is not heavy enough to exert sufficient rotary drilling force, a downward force may be created upon the kelly so as to add to the force of the bit against the formation. One well known way of increasing the drilling force is to have the kelly mounted for example as on a truck, with provision for jacking the truck up on the kelly so as to add the weight of the truck to the forces of the bit against the formation.

However there are cases where the hole becomes so deep that natural weight of the bit and drill string creates forces of the bit against the formation in excess of those which can be tolerated. In this type of situation, it is known to actually exert an upward force on the upper end of the drill string to take some of the load off of the bit. This is a situation intended to be applicable to the FIGURE 2 arrangement, where upward forces may actually be exerted through the medium of the swivel component 22. In any case where an upward force is being exerted on the upper end of the drill string to relieve the stress upon the bit, there will be a certain point in the string between the bit and the swivel whereat, moving downwardly along the string, the internal stresses in the string changed from tensile stresses to compressional stresses. This can be calculated in advance from knowledge of the mass per unit length of the structure making up the drill string. The dimension L in FIGURE 2, from the bit to the location of the hammer mechanism 18 is intended to denote the length of drill string wherein compressional stresses exist during an operation where upward forces are being exerted on the swivel.

It has been found to be preferably practical to locate the hammer mechanism no further above the bit than the distance L as defined above, when upward forces are applied to the upper end of the drill string. It appears that the percussion blows are transmitted to the bit with least attenuation when these waves need not travel through the part of the drill string under tension.

To complete the explanation of FIGURES 1 and 2, it may be added that usual rotary bit drilling calls for passage of flushing fluid downwardly through the interior of the drill string. Upon reaching the bit, ports are provided for this flushing of fluid to emerge in the vicinity of the cutting edges, and the fluid then passes upwardly in the hole, carrying with it the cuttings, to a suitable cap structure 24 at the surface of the formation, which has a fluid outlet means 26 for exhausting the fluid with cuttings. Fushing fluid may be entered into the drill string by a suitable hose or like means 28 associated with the swivel structure 22.

Figure 3:
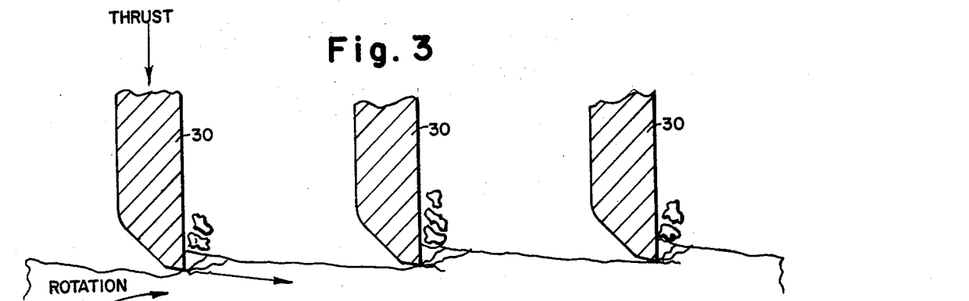
FIGURE 3 is a developed, fragmentary cross-sectional view illustrating the action of the blades of a three bladed drag bit on the bottom of the formation when utilized in accordance with conventional rotary drilling practices.

FIGURES 3–6 of the drawings illustrate the improved cutting action obtained by the present invention over conventional rotary type drilling. For example, FIGURE 3 schematically illustrates the action of a conventional three bladed drag bit on formation being drilled by the conventional application of thrust and rotation. As shown, the formation is removed by the combined action of the thrust on the bit and its rotary movement in contact with the formation. With this type of action, each blade 30 serves to chip off a portion of the formation contacted thereby in the manner illustrated.

Figure 4:
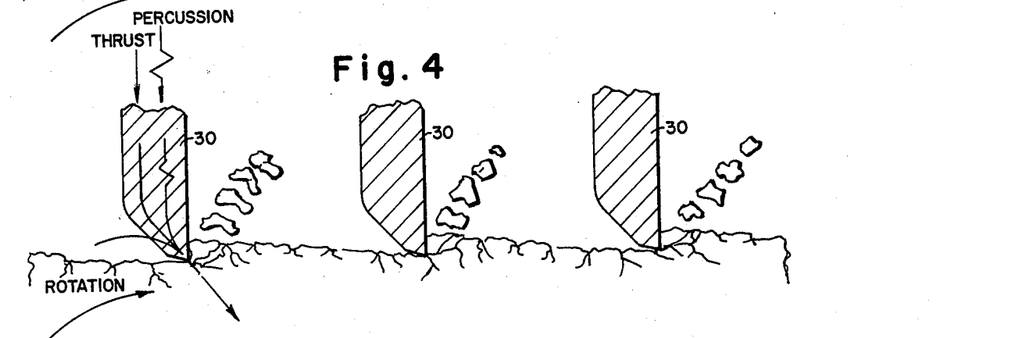
FIGURE 4 is a view similar to FIGURE 3 illustrating the action of the blades on the formation when utilized in accordance with the teachings of the present invention.

In accordance with the teachings of the present invention, by superimposing on the thrust and rotation conventionally utilized, a series of relatively light percussion blows in a direction tending to move the bit into the formation, the latter serve to cause the smooth edges of the blades to momentarily become a point like the tooth on a saw and a constant repetition of these increased thrust points accomplishes a rate of penetration on the harder formation never before possible with either of the older methods or by any combination of the same previously proposed. This rapid change of thrust application acts in the same sense as the teeth of a saw or the saw-tooth edge of a bread knife. Thus, where a smooth straight edge would tend to slide over the surface, as shown in FIGURE 3, the rough edge cuts in and the penetration is therefore considerably greater, as shown in FIGURE 4.

As mentioned above, it should be borne in mind that the percussion blows are relatively light with respect to the thrust being applied, so that the point of the blades of the bit never leave the surface of the formation being drilled. Therefore, there is no vibration up the drilling rod. The greater thrust force being continuously applied while the bit is rotated transfers the lesser force of the percussion blows directly to the formation being drilled through the edges or points of the blades. This direct transfer of energy to the formation through the edges or points of the drilling bit creates a downward shock wave in the formation being drilled and a portion of the formation at the points or edges of the blades is removed or broken away by the momentary increase in vertical thrust at each percussion blow, as shown in FIGURE 4.

Since the greater force of applied rotary drilling thrust holds the points or edges of the bit in contact with the formation at the point of penetration on each percussion stroke, the rotating action of the drilling rod or pipe turns or thrusts the blades against the surface of the rock or formation being drilled. With this torque energy continuously applied against the formation or rock after it is penetrated by the continuous vertical thrust and the momentary thrust of the hammer blows, a greater portion of the energy from the thrust actions is transferred to the formations directly at the front edge or point of each blade as it continues on its course during its rotation. Thus, the greater force of the rotary applied thrust continually holding the point of each blade at its most downward position after each hammer stroke obtains a faster penetration, since the depth gained by this action causes each blade point to stay in the formation at a lower level than the formation immediately in its path of rotation. The rotation torque or energy constantly moving each blade forward transfers a major portion of these applied energies to the formation directly in front of the blade edges or points.

Figure 5:
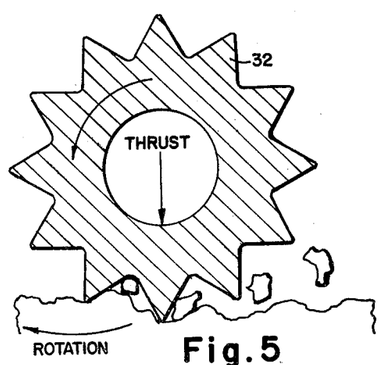
FIGURE 5 is a fragmentary cross-sectional view illustrating the action of a single roller of a roller bit when utilized in accordance with conventional rotary drilling practices.
Figure 6:
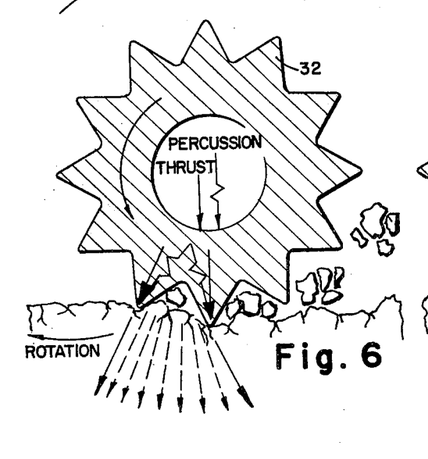
FIGURE 6 is a view similar to FIGURE 5 illustrating the action of the roller when utilized in accordance with the teachings of the present invention.

The same improved cutting action is achieved by the present invention with the use of conventional roller type bearing bit or cone bit as can be seen fom FIGURES 5 and 6. FIGURE 5 illustrates the cutting action obtained by the use of a single roller 32 of a conventional roller cutting bit where the forces applied are solely that of thrust and rotation. In contrast, it will be seen from FIGURE 6 that the chipping action on the formation when relatively light percussion blows are superimposed on the thrust and rotation forces applied causes the formation directly in front of the edge or point of the cone in contact with the formation to dig into the latter a greater depth than is the case with only power thrust and rotation. The reason for this improved action in the case of rotary cone bits is similar to that described above in connection with drag bits.

It will be readily appreciated that the action achieved by the present invention is considerably different from that achieved by the use of a conventional percussion type bit. As stated previously, while such bits are usually rotated in operation, the energy applied to effect rotation is not directly transmitted to the formation but is applied usually when the bit is not in contact with the formation. Thus, except for the fact that the cutting action is improved because of contact with the entire bottom of the formation being drilled, the rotary energy imparted to the percussion bit is not directly utilized to effect a cutting action on the formation. It will be understood that the design of a conventional percussion-type drilling bit would not efficiently perform any cutting action by rotary action in contact with the formation. Thus for purposes of the present invention it is essential to utilize a "rotary drilling bit" such as a conventional roller type bit or a conventional drag type bit. The term "rotary drilling bit" as herein used designates bits designed for use in rotary drilling and excludes percussion type bits, which, although they may be rotated during use, are not designed to obtain a cutting action as a result of such rotation.

A choice of hammer mechanisms 18 is available for the practice of the invention. These may fall into at least two classes, first, mechanisms operated by rotational movement of the drill string and second, mechanisms operated by fluid which may in fact be the flushing fluid.

In the case of the fluid operated hammer mechanisms, the same structure can be used above ground level (FIG. 1) and below ground level (FIG. 2). In the case of hammer mechanisms which rely upon rotary motion of the drill string, a part of the mechanism such as the casing must be restrained in rotary motion. When used above ground, a restraining linkage can be easily provided to an associated fixed structure, such as the drilling rig. At low ground, some device must be provided for gripping at sides of the hole, while permitting downward movement of the mechanism.

While it will be appreciated that no limitation to any particular type of generator of percussion waves is necessary to the present invention, some examples are nevertheless now given for a complete understanding of the entire operation. The hammer mechanisms to be described hereinbelow are in fact considered to present patentably inventive features and per se are the subject of separate applications filed concurrently herewith.

With reference to FIGURES 7–12, the hammer mechanism operable by virtue of the rotation of the drill string is illustrated. With minor modifications as will be explained later, this type of mechanism may be employed either above the ground surface as in FIGURE 1, or down the hole as in FIGURE 2. The difference lies in the manner of arresting rotary motion of a casing.

Figure 7:
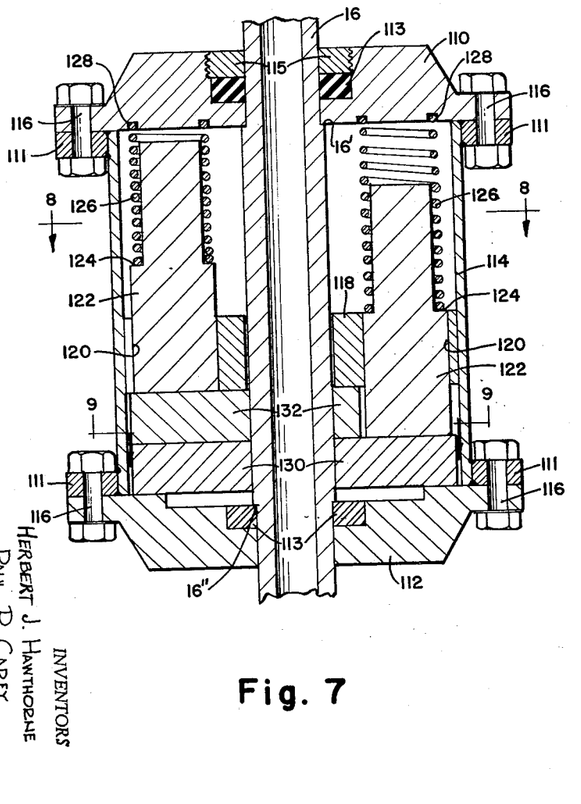
FIGURE 7 is a vertical sectional view of one embodiment of a percussion hammer mechanism which may be utilized in the present invention.

As best shown in FIGURE 7, a length of the drill string or rod 16 is provided with a slightly enlarged portion existing between oppositely facing shoulders 16' and 16". At the top a circular plate 110 fits string 16 at shoulder 16', and at the bottom a circular plate 112 fits string 16 at shoulder 16". A cylindrical casing 114 joins plates 110 and 112 by virtue of a series of clamping bolts 116 extending through the upper and lower plates and upper and lower flanges 111 fixed to the casing 114.

In order to prevent foreign material entering the hammer chamber, typical resilient sealing rings 113 may be employed between the stationary plates 110, 112, and the drill string 16. To facilitate assembly, the upper sealing ring 111 is preferably retained by a screw threaded member 115, freely rotatable upon drill string 16 and threaded into plate 110.

Figure 8:
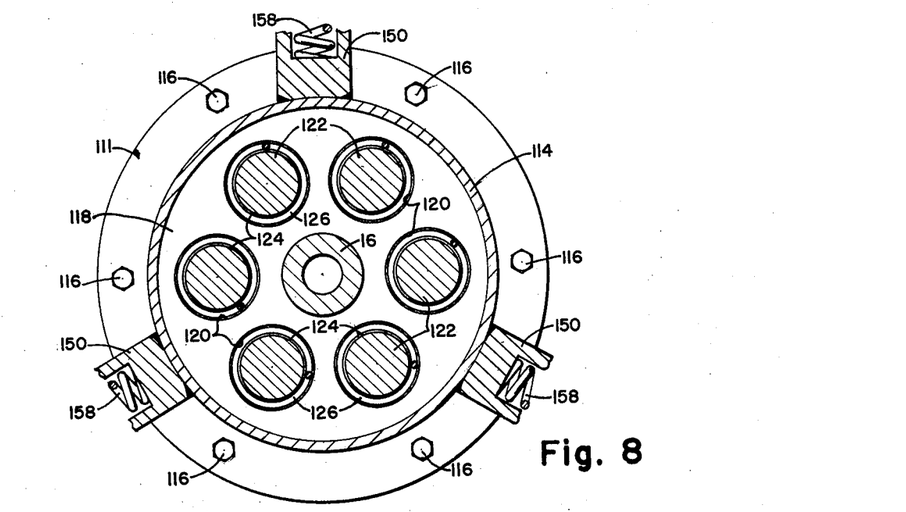
FIGURE 8 is a cross-sectional view taken along the line 8—8 of FIGURE 7.

Intermediate the ends of casing 114 and fixed thereto is a circular plate 118 having an aperture in the center in which string 16 is freely rotatable. As best shown in FIGURE 8, plate 118 has spaced around it a plurality of apertures 120 in which are slidably positioned a plurality of hammer members 122. Each hammer member 122 is characterized by a shoulder 124 intermediate its length for receiving one end of a spring 126 which is confined under compression by having its upper end rest in an annular groove 128 in the plate 110.

Also within the casing 114 resting on the plate 112 and firmly attached to the string 16 is an anvil member 130. Immediately above the anvil member 130 is a cam member 132, fixed to the drill string 116 so as to rotate therewith. If desired, members 130 and 132 may be integral. The basic requirement of cam member 132 is that it rotate with the drill string. The basic requirement of anvil member 130 is that it be firmly attached to the drill string so that percussion blows generated therein will be transmitted to and travel downwardly through the drill string.

Figure 9:
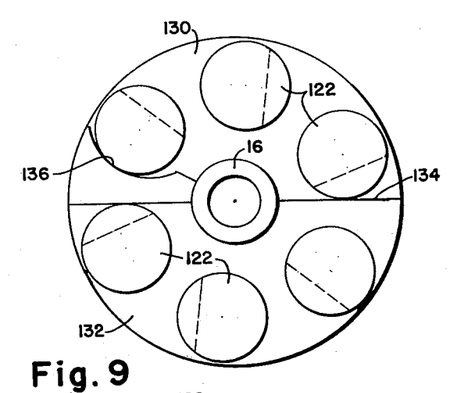
FIGURE 9 is a fragmentary cross-sectional view taken along the line 9—9 of FIGURE 7.
Figure 10:
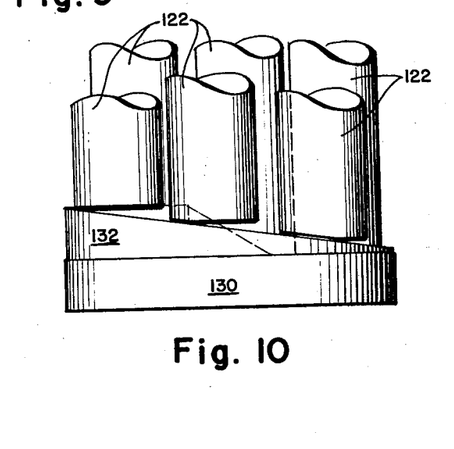
FIGURE 10 is a front elevational view of the structure shown in FIGURE 9.

The cam member 132 extends only partially around the complete circle, as best seen in FIGURES 9 and 10. At the beginning of the cam member, so to speak, there is a hammer pick-up point or edge 134 (FIG. 9). The thickness of the cam member gradually increases (FIG. 10) until it reaches its complete thickness at an arcuate end point 136 (FIG. 9).

It should now be apparent that with drill string 16 undergoing rotation, while casing 114, plates 110 and 112 and hammer cage 118 remain stationary, the cam member 132 will sequentially elevate each hammer member 122 against the force of its spring 126 until the end 136 of the cam member passes completely beneath a particular hammer member 122. At this moment the spring 126 will forcibly drive the hammer member into contact with the anvil member 130. Percussion or compressional waves generated by this impact will travel through the anvil member 130 to the drill string 16 and from there to the drilling edges of the bit.

With a plurality of hammer members as shown in FIGURES 7–10, it will be appreciated that relatively slow rotation of the drill string 16 will nevertheless result in a high frequency of compressional waves delivered to the cutting edges of the bit. It is preferable that the frequency of the compressional waves be varied by means other than varying the rotation of the drilling string 16. For example, if a lesser frequency is desired, one or more of the hammer members could be removed prior to installation. If a higher frequency is desired, additional hammer mechanisms could be mounted on the drilling string and the number of hammer members employed in such mechanism or mechanisms could be suitably varied in the same manner indicated above.

Figure 11:
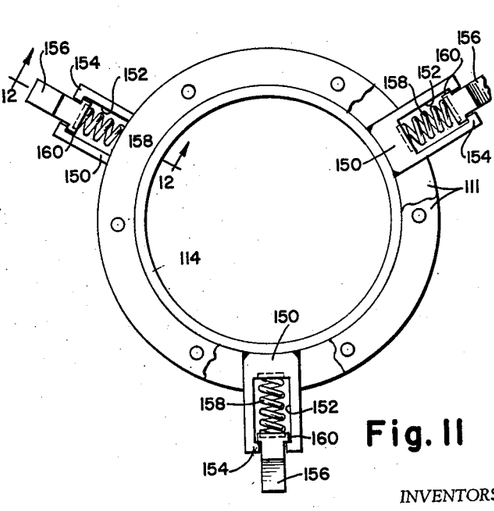
FIGURE 11 is a top plan view with parts broken away of the casing of the hammer mechanism.
Figure 12:
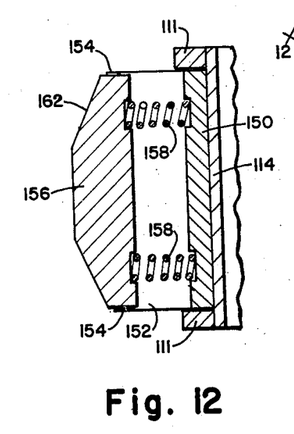
FIGURE 12 is a fragmentary cross-sectional view taken along the line 12—12 of FIGURE 11.

Particularly excellent results have been achieved drilling a 2½" diameter hole in limestone formation by applying 5 to 6 tons downward force on the bit and delivering about 750 hammer blows per minute with a hammer of approximately 12 pounds with a 2.5 inch stroke.

Where the hammer mechanism as shown in FIGURES 7–10 is employed above the ground, the stationary parts, i.e. casing 114 etc., may be restrained from rotary motion by any simple linkage connected to the surrounding structure, such as the drilling rig. Where the mechanism is employed down the hole, as shown in FIGURE 2, rotary motion of the casing and associated parts may be arrested by means as shown in FIGURES 11 and 12. Here only the casing 114 is shown because the internal parts will remain the same. At three positions 120° apart about the casing 114 and intermediate the plates 110 and 112 there is affixed as by welding, protruding wings 150 having channels 152 therein characterized by inturned edges 154 for capturing side wall gripping members 156. The latter are urged outwardly by compression springs 158 mounted between the members 150 and 156. The members 156 include outwardly extending flanges 160 which ride in channels 152 and serve to limit the extent of outward movement of the gripping members, by engagement with the inturned edges 154.

The operative position of members 156 is to be such in relation to the diameter of the hole drilled by a particular bit, that before the complete movement of the members 156 outwardly in the channels 152, the outer end surfaces of members 156 will be pressed firmly against the side wall of the hole. Thus, members 156 will tend to dig into the side wall and prevent rotation of the casing 114 and associated parts which are to remain stationary relative to the rotating drill string 16. It will be appreciated that as drilling progresses the drill string 116 must move downwardly in the hole and in order to permit side wall gripping against rotation but still permit downward (and upward) movement of the hammer mechanism in the hole, the gripping members 156 are provided with sloping surfaces 162, at the tops and bottoms thereof as best shown in FIGURE 12.

The fluid actuated type of hammer mechanism 18 is shown in FIGURES 13–18. This mechanism is adaptable without modification for use either above the ground surface in FIGURE 1, or down the hole as in FIGURE 2. It operates by action of fluid, for example air, which may be the same fluid which cleans the hole at the bit. The device of FIGURES 13–18 fits between sections of the drill string 16, with the drill string 16 extending from the bottom proceeding directly to the bit 10 for delivery of compressional waves generated within the mechanism.

The percussion hammer mechanism of FIGURES 13–18 comprises a central, vertically extending core member, generally indicated at 210. The lower end portion of the core member has a central bore 212 formed therein and a threaded counterbore 214 is formed in the lower end of the bore 212 for receiving a portion of the drill string 16 which extends downwardly from the mechanism. Formed in the core member 210 adjacent the threaded counterbore 214 is an annular flange 216, the upper surface of which is arranged to engage and receive the lower end of an outer casing or tubular member, generally indicated at 218. Formed on the lower end of the casing 218 is a bottom wall 220, the lower surface of which is arranged to engage the upper surface of the flange 216. Of course, the bottom wall 220 is centrally apertured, as at 222, to receive the core member 212.

Figure 13:
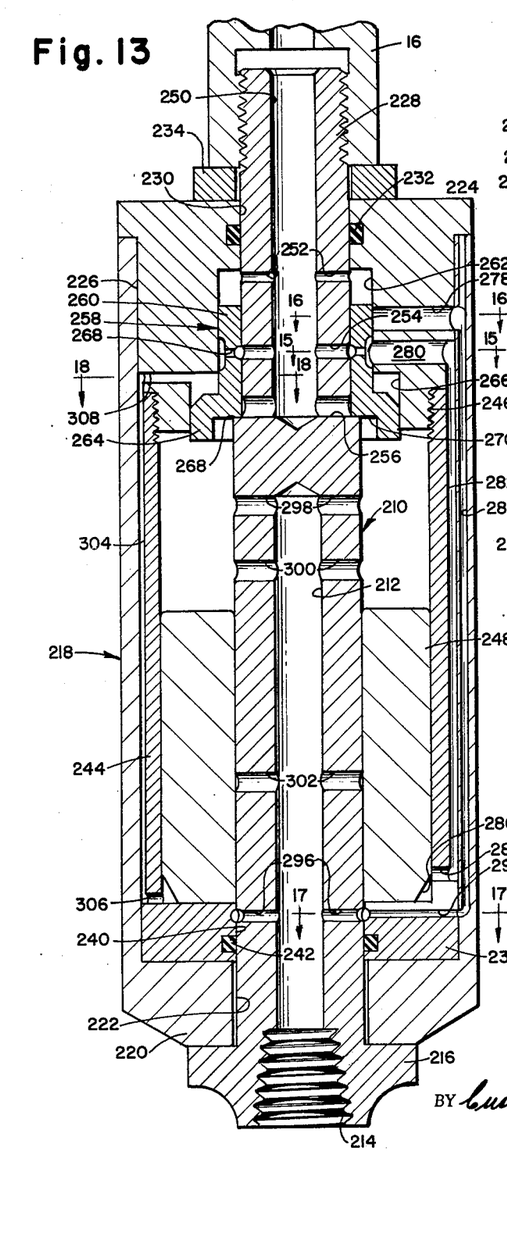
FIGURE 13 is a vertical sectional view of another embodiment of a percussion hammer mechanism which may be utilized in the present invention showing the parts in the position they assume just after the percussion blow stroke.

Mounted within the open upper end of the casing or tubular member 218 is an annular cap member 224 having the lower portion of its periphery relieved, as at 226, to receive the upper end of the tubular member 218. The core member 210 includes an upper end portion 228 which extends upwardly through an opening 230 formed in the cap member 224 and suitable sealing means, such as annular seal 232, is preferably provided between the openings 230 and the upper end portion of the core member 228.

The upper extremity of the core member end portion 228 is exteriorly threaded, to receive the lower end of the drill string 16 disposed above the percussion hammer mechanism 18. A spacer ring or washer 234 is mounted between the lower extremity of the drill string 16 and the upper surface of the cap member 224, and serves to maintain the casing 218 and the cap member 224 in engagement with the flange 216 of the central core member 210.

Mounted within the casing 218 is an anvil member generally indicated at 236. The anvil member includes a bottom wall 238 which is centrally apertured, as at 240, to receive the core member 210. Preferably, suitable sealing means, such as annular seal 242, is provided between the opening 240 and the adjacent portion of the core member. The bottom wall 238 of the anvil member 236 is arranged to engage the bottom wall 220 of the casing and has a tubular wall 244 extending upwardly therefrom for threaded engagement with the lower recessed extremity of the cap member 224, as indicated at 246. A sleeve-like hammer member 248 mounted in surrounding relation to the core member 210 with the cylindrical wall 236 of the anvil member is arranged to reciprocate longitudinally within the chamber defined by the cylindrical wall 244, the lower end of the cap member 224 and the bottom wall 238.

As indicated above, the percussion hammer mechanism 18 of the present invention is arranged to be actuated by fluid, preferably the fluid utilized in the drilling installation to clean the cuttings from the bottom of the formation. To this end, the upper end portion 228 of the core member has formed therein a bore 250 which terminates inwardly of the core member in spaced relation to the inward termination of the lower bore 212. Fluid, as for example air passing downwardly through the upper drill string 16, enters the bore 250 and passes radially outwardly therefrom selectively through a series of longitudinally spaced pairs of diametrically opposed, radially extending ports or openings 252, 254 and 256.

The flow of fluid through the ports 254 and 256 is controlled by means of a valve member, generally indicated at 258. The valve member includes an upper hollow cylindrical portion 260 which closely embraces the upper end portion 228 of the core member for longitudinal sliding movement thereon. Formed in the cap member 224 is a first counterbore 262 for slidably receiving the upper end portion 260 of the valve member 258. The lower portion of the valve member 258 is formed into a generally bell-shaped configuration, as indicated at 264, and is arranged to slidably reciprocate within a second counterbore 266 formed in the cap member.

The flow of fluid through the lower port 256 is controlled by means of an annular shoulder or valve seat 268 formed on the core member 210 adjacent the lower end of the reduced upper end portion 228 thereof, and a cooperating annular surface 270 formed on the bell-shaped lower end portion 264 of the valve member.

The flow of fluid through the intermediate ports 254 is controlled by means of a pair of diametrically opposed ports 272 extending radially through the upper end portion 260 of the valve member. The inner ends of the ports 272 communicate with an annular groove 274 formed in the interior surface of the upper end portion 260 of the valve member and the outer ends communicate with an annular groove 276 formed in the exterior surface of the end portion 260.

Figure 14:
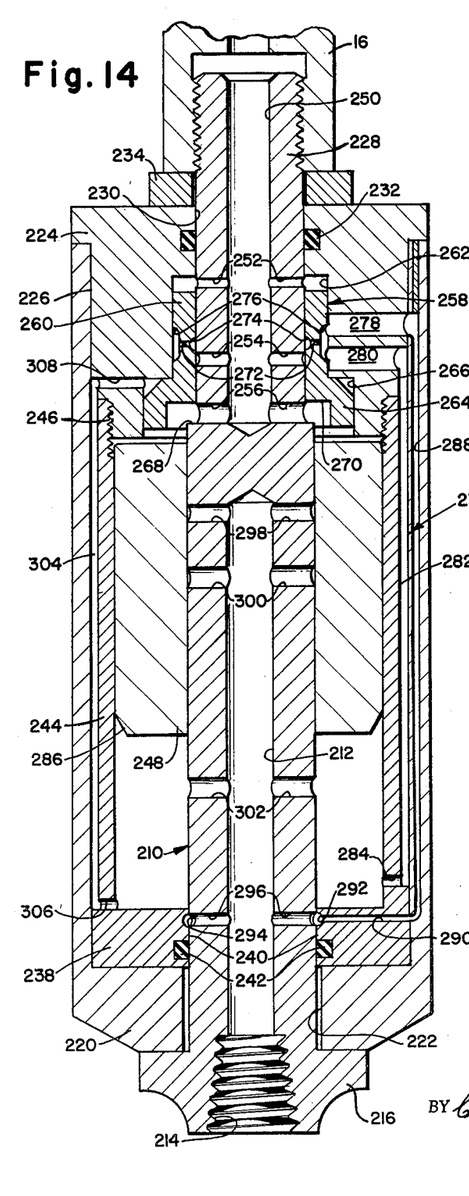
FIGURE 14 is a view similar to FIGURE 13 showing the parts in the position they assume just prior to the percussion blow stroke.
Figure 15:
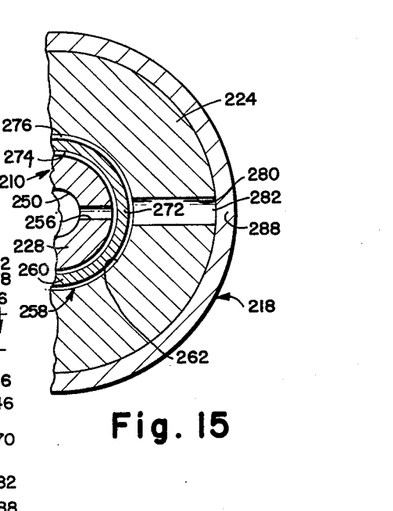
FIGURE 15 is a fragmentary cross-sectional view taken along the line 15—15 of FIGURE 13.

The annular groove 276 also controls the flow of fluid to upper and lower longitudinally spaced radially extending ports 278 and 280 formed in the adjacent portion of the cap member. As best shown in FIGURE 15, the inner end of the lower port 280 is arranged to communicate with the annular groove 276 and the outer end thereof communicates with the upper end of a longitudinally extending recess 282 formed in the exterior of the cylindrical wall 244 of the anvil member. The lower extremity of the recess communicates with the interior of the cylindrical wall 244 adjacent the bottom wall 238 by means of a radially extending port 284. As best shown in FIGURES 13 and 14, the lower extremity of the hammer member 248 has its outer periphery relieved, as indicated at 286, to permit fluid from the port 284 to act upwardly on the hammer member.

Figure 16:
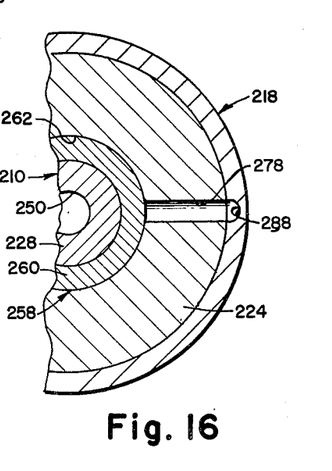
FIGURE 16 is a fragmentary cross-sectional view taken along the line 16—16 of FIGURE 13.
Figure 17:
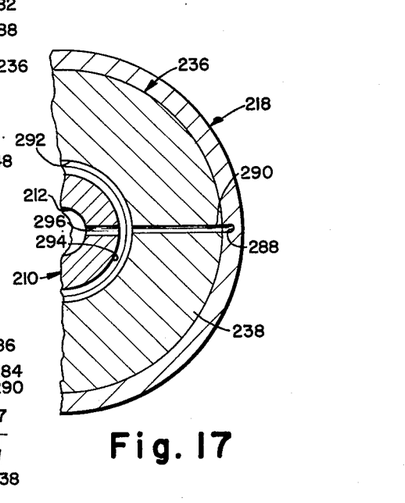
FIGURE 17 is a fragmentary cross-sectional view taken along the line 17—17 of FIGURE 13.

As best shown in FIGURE 16, the outer end of the upper port 278 communicates radially with the upper end of a passage 288 extending longitudinally through the main cylindrical wall of the tubular casing 218. The lower end of the passage 288 communicates with the outer end of a passage 290 extending radially through the bottom wall 238 of the anvil member 236. As best shown in FIGURE 17, the inner end of the passage 290 communicates with an annular groove 292 formed in the opening 240 of the bottom wall 238. The annular groove 292 registers with an annular groove 294 formed in the exterior of the core member 210 and a pair of diametrically opposed ports 296 extending radially inwardly from the annular groove 294 into communication with the bore 212 formed in the core member 210.

The passage of fluid from the chamber within which the hammer member 248 is slidably mounted for longitudinal reciprocation is provided by pairs of diametrically opposed radially extending openings 298, 300 and 302 formed in the core member in communication with the bore 212.

Figure 18:
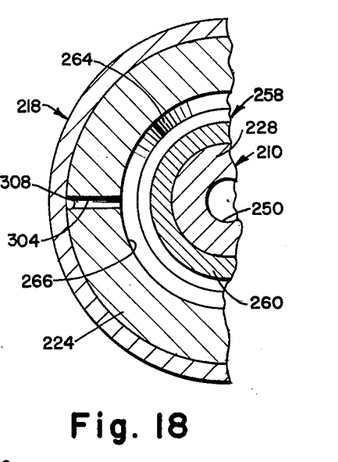
FIGURE 18 is a fragmentary cross-sectional view taken along the line 18—18 of FIGURE 13.

Formed in the exterior periphery of the cylindrical wall 244 of the anvil member 236 in diametrically opposed relation to the recess 288 is a longitudinally extending valve actuating recess 304, the lower end of which communicates with the interior of the cylindrical wall 244 adjacent the bottom wall 238 by a radially extending passage 306. As best shown in FIGURE 18, the upper end of the recess 304 communicates with the upper end of the second counterbore 266 in the cap member 224 by means of a radially extending passage 308 formed in the latter.

In operation, it will be understood that the hammer member 248 is longitudinally reciprocated within the chamber provided by the cylindrical wall 244 in a continuous cycle. For purposes of convenient description the operation of the percussion hammer mechanism will be set forth below beginning with that point in the cycle just after the hammer mechanism has delivered a percussion blow.

As shown in FIGURE 13, in this position the hammer mechanism 248 will be disposed in the lower portion of the chamber in engagement with the bottom wall 238 of the anvil member. In addition, the valve member 258 will be disposed in its lowermost position with the annular surface 270 in engagement with the valve seat 268 to prevent flow of fluid through the ports 256 and with the ports 272 of the valve member communicating the intermediate ports 254 with the port 280 and closing off flow to the port 278.

It will be seen that fluid from the upper portion of the drill string 16 entering the bore 250 will pass through the ports 254, valve ports 272, cap member port 280, recess 282 and port 284 into the lower end of the hammer chamber, thus causing the hammer member therein to be moved upwardly. During the upward movement of the hammer member 248 the air in the hammer chamber thereabove will be forced outwardly through the openings 298 and 300. As the hammer member moves upwardly, the upper opening 298 will be covered so that during subsequent upward movement the air trapped in the upper portion of the chamber will act upon the lower bell-shaped end 264 of the valve member and move the same upwardly into the position shown in FIGURE 14. This movement of the valve member 258 interrupts communication between the valve port 272 and the inlet ports 256 of the core member 210 and communicates the lower port 280 with the upper port 278 through the exterior annular groove 276 of the valve member. In addition, the annular surface 270 of the valve member moves away from the valve seat 268 permitting the lower ports 256 to communicate with the upper end of the hammer chamber. This condition of the hammer mechanism is illustrated in FIGURE 14. It will be noted that the fluid from the drill string passing through the upper bore 250 will now pass through the lower ports 256 into the upper end of the hammer chamber, thus causing the hammer member 248 to move downwardly.

Downward movement of the hammer member 248 will cause the air in the lower portion of the hammer chamber to pass outwardly into the bore 212 through the lower openings 302. As the hammer member 248 closes the openings 302 during its downward movement, the air in the lower portion of the hammer chamber will be compressed and forced outwardly through port 284, recess 282, port 280, and then into port 278 through the exterior valve member recess 276. From the port 278 the air passes through the passage 288, port 290 and core member ports 296 into the bore 212.

It will also be noted that during the downward movement of the valve member 248 past the openings 232, the air in the lower portion of the hammer chamber will be compressed and this increase in pressure will also be transmitted through port 306, recess 304, port 308 and counterbore 266 which will cause the valve member to move downwardly into its lowermost position as shown in FIGURE 13.

Of course, at the end of the downward movement of the hammer member, the same will strike the bottom wall 238 of the anvil member with a percussion blow and the compression wave thus caused will be transmitted directly by the drill string connected to the lower end of the core member to the rotary drilling bit 10 on the lower end thereof. It will also be understood that the air or other fluid entering the bore 250 at the upper end of the hammer mechanism will eventually pass into the lower bore 212 from which it is directed by the pipe string 16 connected to the lower end of the hammer mechanism to the bottom of the formation being drilled through the rotary drill bit to perform the usual function of clearing the cuttings from the formation.

It will be noted that the fluid pressure entering the bore 250 will at all times pass into the upper end of the counterbore 262 through ports 252 and therefore act on the upper end of the valve member 258. The existance of this constant pressure acting downwardly on the valve member 258 aids in effecting a movement of the valve member at the proper time in the cycle of operation, that is, prevents the creation of compression or vacuum conditions within the bore 262 which would detrimentally effect the free movement of the valve member.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A method of drilling earth formations with a rotary cutting bit on the lower end of a continuously rotating drill string which comprises effecting continuous rotary cutting action by said bit while maintaining a steady downward force on the bit to continuously maintain same against the formation, superimposing upon said bit successive percussion blows in a direction to drive the bit into the formation with a force substantially less than said downward force to thereby prevent the bit from moving upwards between said blows, and completing said last-mentioned step independently of any fluid flow within the hole formed thereby wherein a substantial section of the drill string above the bit is under compression and wherein the percussion blows are applied at the upper end of this section.

2. A method as defined in claim 1 wherein the remaining upper section of the drill string above the point where the blows are applied is under suspension.

References Cited in the file of this patent

UNITED STATES PATENTS

| | | |
|---|---|---|
| 1,697,570 | Mecom | Jan. 1, 1929 |
| 2,228,482 | Prebensen | Jan. 14, 1941 |
| 2,425,012 | Snyder | Aug. 5, 1947 |
| 2,554,005 | Bodine | May 22, 1951 |
| 2,620,162 | Pennington | Dec. 2, 1952 |
| 2,635,852 | Snyder | Apr. 21, 1953 |
| 2,638,325 | Joy | May 12, 1953 |
| 2,641,445 | Snyder | June 9, 1953 |
| 2,756,960 | Bassinger | July 31, 1956 |
| 2,836,395 | Bielstein | May 27, 1958 |
| 2,851,251 | Mori | Sept. 9, 1958 |
| 2,873,093 | Hildebrandt et al. | Feb. 10, 1959 |
| 2,905,439 | Martini | Sept. 22, 1959 |